United States Patent [19]

Smith

[11] Patent Number: 5,369,801
[45] Date of Patent: Nov. 29, 1994

[54] ANTENNA DIVERSITY RECEPTION IN WIRELESS PERSONAL COMMUNICATIONS

[75] Inventor: Roland A. Smith, Nepean, Canada

[73] Assignee: Northern Telecom Limited, Montreal, Canada

[21] Appl. No.: 950,513

[22] Filed: Sep. 25, 1992

[51] Int. Cl.$^5$ .............................................. H04B 7/08
[52] U.S. Cl. .................................. 455/277.1; 455/134; 375/100
[58] Field of Search .................. 455/272, 277.1, 277.2, 455/132, 133, 134, 135; 375/100, 25, 27; 370/95.3, 77

[56] References Cited

U.S. PATENT DOCUMENTS

| | | |
|---|---|---|
| 4,495,653 | 1/1985 | Hamada . |
| 4,696,058 | 9/1987 | Tachita et al. . |
| 4,704,734 | 11/1987 | Menich et al. . |
| 4,864,642 | 9/1989 | Ueno et al. . |
| 4,977,615 | 12/1990 | Suzuki et al. . |
| 4,977,616 | 12/1990 | Linder et al. . |
| 5,067,173 | 11/1991 | Gordon et al. . |
| 5,097,484 | 3/1992 | Akaiwa . |
| 5,152,009 | 9/1992 | Sato .............................. 455/277.1 |
| 5,203,024 | 4/1993 | Yamao ............................ 455/277.1 |
| 5,239,541 | 8/1993 | Murai ............................ 455/277.2 |
| 5,241,701 | 8/1993 | Andoh ............................ 455/272 |

FOREIGN PATENT DOCUMENTS

| | | |
|---|---|---|
| 0318665 | 6/1989 | European Pat. Off. . |
| 0440239 | 8/1991 | European Pat. Off. . |
| 9114314 | 9/1991 | WIPO . |

OTHER PUBLICATIONS

Yamao, Y. et al, "Predictive Antenna Selection Diversity (PASD) for TDMA Mobile Radio", 46.4.1-5, IEEE 1991, ICC '91, pp. 1480-1484.

Primary Examiner—Edward F. Urban
Assistant Examiner—Nguyen Vo
Attorney, Agent, or Firm—Yoshiharu Toyooka

[57] ABSTRACT

An antenna diversity technique for use in wireless personal communications is disclosed. In the so called microcellular phone environment, fading in signal reception is an important consideration. A new way of performing the antenna diversity involves antenna switching during a period of data reception which may results in minimum bit hits to data. The system only requires single receiving part.

6 Claims, 2 Drawing Sheets

ANTENNA DIVERSITY RECEPTION IN WIRELESS PERSONAL COMMUNICATIONS

FIELD OF THE INVENTION

The present invention generally is directed to wireless personal telecommunication. In particular, it is directed to a technology of the antenna diversity reception of digital signals used in such a telecommunication.

BACKGROUND OF THE INVENTION

In wireless personal telecommunication, fading causes the fluctuation of reception level and therefore deterioration in the communications. As a method of reducing the fading, a diversity reception has been widely performed. For example if a plurality of antennas are set up keeping predetermined distances from each other, a probability that all the signals from the plural antennas are simultaneously attenuated is little, and hence a high reliability is assured. Signal to Interference margins can be increased by as much as 10 dB when two antennas are used rather than one. Various kinds of diversity reception methods are known. U.S. Pat. Nos. 4,696,058, issued Sep. 22, 1987 (Tachita et al), and 4,977,616 issued Dec. 11, 1990 (Linder et al), for example, teach diversity receivers which use two or more antennas and one receiver circuit. An antenna selection circuit switches to any one of the antennas in response to received signal strength indication generated by the receiver. In U.S. Pat. No. 5,097,484, issued Mar. 17, 1992 (Akaiwa), on the other hand, discloses a system which uses two antennas and two receivers.

In the wireless personal telecommunication environment, it is normally the cordless fixed part (often called base station) that performs antenna diversity reception because it is more difficult to provide more than one antenna in the cordless portable part (often called microcellular phone, handset or such name). In one system such as one taught in the above-referenced U.S. Pat. No. 5,097,484, a link from the base station to a handset is carried out at one frequency and a link in the opposite direction is at a different frequency. In the digital communication environment, it is also possible to use a duplexer which permits a two-way communication on a single frequency. U.S. Pat. No. 5,067,173, issued Nov. 19, 1991 (Gordon et al) describes such an arrangement.

In most cases, if "perfect" diversity is assumed, a system requires apriori knowledge of the received signal strength indication (RSSI for short) at all antennas which can be selected. Such information can only be achieved through the use of dual receivers. In such an arrangement, the RSSI of the signal received on each antenna is continuously monitored, and the best antenna is always selected. This implementation adds considerable cost to a radio receiver. However, without a dual receiver, the unused antenna must be sampled periodically, resulting in bit hits (lost or corrupted bits) or frame hits (lost or corrupted TDD frame) in the received data whenever the "tested" antennas has a very poor RSSI.

It is therefore desirable to implement antenna diversity while only using a single receiver, and at the same time minimize the effect of bit hits due to antenna switching.

OBJECTS OF THE INVENTION

It is therefore an object of the present invention to provide a process of and apparatus for performing antenna diversity in the reception of digital radio signals.

It is another object of the present invention to provide a process of and apparatus for performing antenna diversity in the reception of digital radio signals in which impact to data of bit hits is minimized.

It is a further object of the present invention to provide a process of and apparatus for performing antenna diversity in the reception of digital radio signals in which no dedicated time slots in the formats for data stream is required for antenna switching.

SUMMARY OF THE INVENTION

Briefly stated therefore, the present invention is directed to a process of performing antenna diversity in reception of a digital radio signal transmitted in tithe division pulse coded frames, each frame containing a fixed number of coded bits in a specific format. The process comprises steps of receiving the digital radio signal by one of a plurality of antennas and generating the received signal strength indication RSSI of the one antenna. Further steps are included for switching the one antenna to one of the remaining antennas to receive a predetermined number of bits in one frame, starting at the nth bit from the beginning of the one frame which has a low significance in decoding the specific format, n being a positive integer smaller than said fixed number. The process continues by deriving the RSSI of the one of the remaining antennas, comparing the RSSI of the one antenna with the RSSI of the one of the remaining antennas, and choosing the antenna with a larger RSSI for reception of following frames of the digital radio signal.

BRIEF DESCRIPTION OF THE DRAWINGS

For a more complete understanding of the present invention and for further objects and advantages thereof, reference may now be made to the following description, taken in conjunction with the accompanying drawings, in which.

DETAILED DESCRIPTION OF THE PREFERRED EMBODIMENTS OF THE INVENTION

In the above-mentioned U.S. Pat. No. 5,097,484, there are described two kinds of data formats either one of which can be used for customer data transmission in the system described. It should be reminded here that this patent uses different frequencies for down link and up link. The first format contains a preamble field and data field in a frame. The second format further has a postamble field in addition to the above two fields. The preambles and postambles are provided for the purpose of the antenna switch. Thus according to the patent, depending upon the format used, a test antenna is switched on either during the postamble or preamble, both of which should be at least long enough to measure its RSSI. The RSSI of the test antenna is compared with that of the current antenna. The result of the comparison determines either to switch to the test antenna as the best antenna or to stay on the current antenna. The antenna switch takes place during the same preamble or during the preamble of the following frame.

In U.S. Pat. No. 4,977,616, also referred to above, the reception of a signal is continuous but the signal being received is time division multiplexed so that it contains information which is of no interest to the receiver as well as that of interest. The testing and switching of a new antenna is carried out during the reception of information of no interest.

Figure 1:
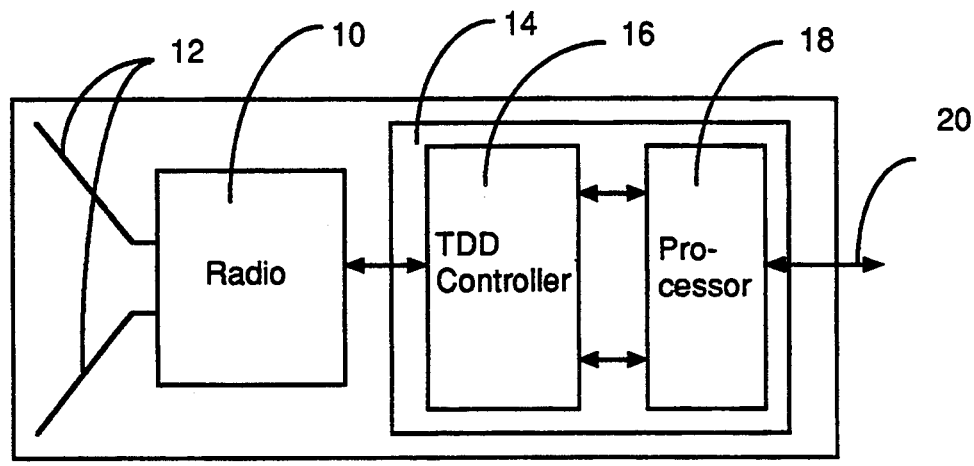
FIG. 1 is a schematic block diagram of a base station according to an embodiment of the invention.

FIG. 1 shows a base station according to one embodiment which includes a radio front end 10 with two or more antennas 12 and a radio controller 14 which is in turn made up with a TDD (time division duplex) controller 16 and a processor 18. The base station is connected by wires 20 to a switching equipment.

Figure 2:
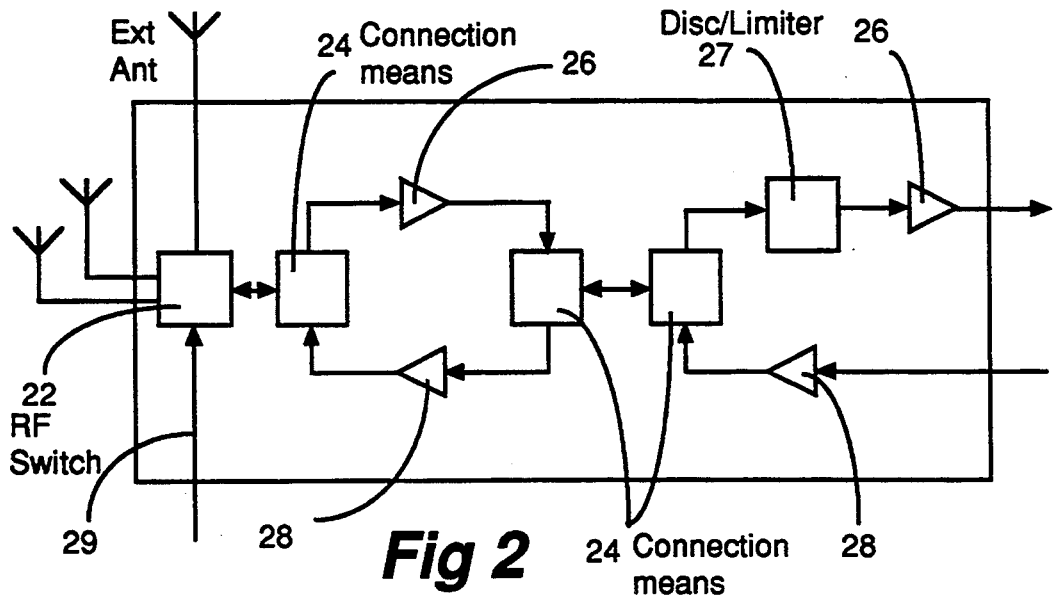
FIG. 2 is a schematic block diagram of a front end of the base station radio.
Figure 3:
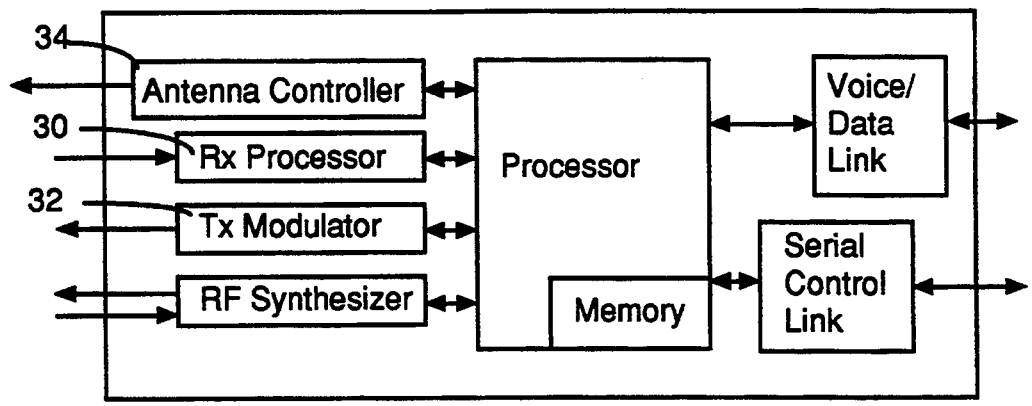
FIG. 3 is a schematic block diagram of a radio controller.

FIG. 2 is a block diagram of the front end of the radio. Under ETSI CAI (European Telecommunications Standard Institute, Common Air Interface) specifications, a base station handles a multiplicity of channels in the specified frequency band in time division duplex. Two antennas are provided inside the base station housing and there is a connection port for an optional external antenna also. An RF switch 22 permits a connection of one antenna to the front end of the radio. A transceiver follows the RF switch and contains various means 24 to switch between a receiving part and transmitting part. The receiving part includes amplifiers 26 and a discriminator/limiter 27 and the transmitting part includes amplifiers 28. Frequency conversion is at various stages. In FIG. 3 the radio controller is shown. It includes RX processor 30 and TX modulator 32 for encoding and decoding respectively. An antenna controller 34 generates antenna control signals which are applied at 29 to the RF switch 22 of FIG. 1. Voice/data link serial control link and a processor containing memory are also shown as boxes. The antenna controller 34 compares RSSI of various antennas and determines the best antenna for subsequent transmission.

Figure 4:
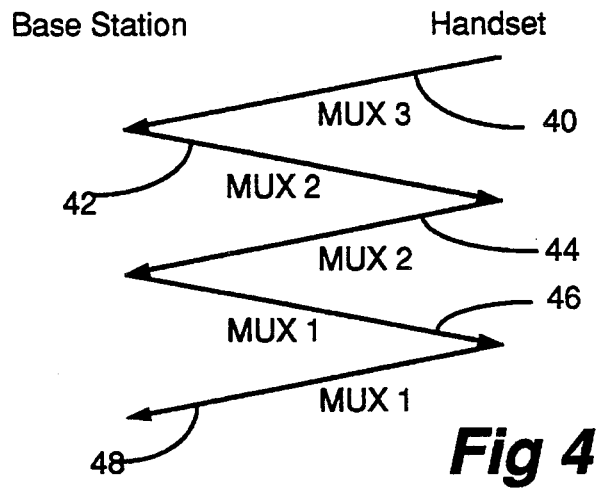
FIG. 4 is a diagram showing various stages of link connection process.

Also in the ETSI CAI specifications, there are three formats of the data stream used between a base station and a handset. They are MUX 3, MUX 2 and MUX 1. Each of the formats contains some of the following data bits which are also defined in the specifications: D bits (Data Channel bits) for data management/control of link protocol; B bits (Bearer Channel bits) which are customer data; and SYNC bits (Synchronization Channel bits) which further consist of P bits (preamble bits) and Sync bits (Synchronism Marker bits). Referring to FIG. 4, there is shown a diagram which illustrates various stages of link set-up. At stage 40, when a handset requests a connection, it sends a "link request" containing its id. and other relevant information to a base station in MUX 3. Upon reception of the "link request" at stage 42, the base station responds by sending back to the handset "link grant" in MUX 2. A handset acknowledges at stage 44 the "link grant" in MUX 2. A multiplicity of packets are then exchanged in MUX 2 to initialize the acknowledged data transfer, base and handset capabilities, and link initialization data. The base station then proceeds to connect at stage 46 voice, data by initiating MUX 1. Subsequent transmission at stage 48 is carried out in MUX 1. Of the three, MUX 3 format is asynchronous and is used only by a handset for a "link request". Because it is asynchronous and is only used before a link connection is set up, diversity reception is not essential. MUX 2 format is used by the base station initially for "link grant" and then by the handset. This data format allows both the handset and base station to gain bit and clock synchronization to each others data transmissions. Finally MUX 1 is the data format which is used when a bearer channel is desired and contains customer data. The diversity reception is required for MUX 1 and MUX 2. However unlike the two patents discussed above, it is not possible to create a new field in either format specifically for antenna switching and there are no time slots which carry information of no interest.

Figure 5:
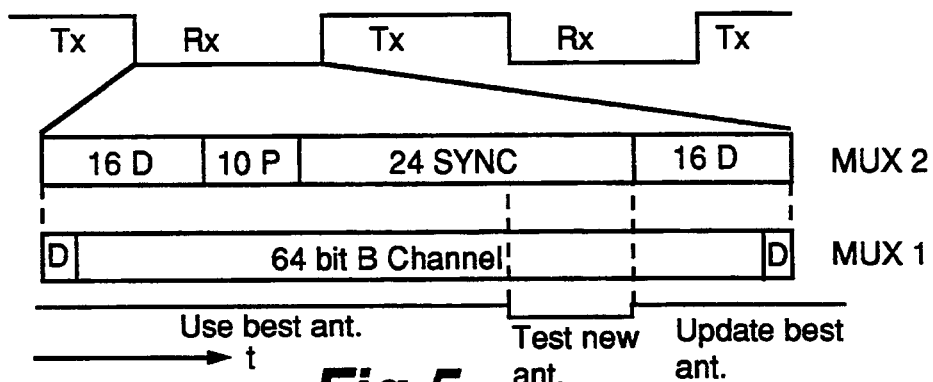
FIG. 5 shows frame formats for MUX 1 and MUX 2.

The present invention makes an inventive use of the MUX 2 and MUX 1 formats to attain improved antenna diversity reception. MUX 2 and MUX 1 formats are shown in FIG. 5 which also depicts that transmission (TX) and reception (RX) are alternate using a same frequency. The duration of TX and RX is in this example 1 ms and contains one frame of data stream. MUX 2 provides 32 D channel bits, with 10 preamble bits (1-0 transitions for slicing level and clock recovery), and 24 bit synchronization channel. The 24 bit sync channel is used to allow both base station and handset to verify that they have achieved proper bit synchronization. Since this synchronization pattern is only useful for initial synchronization, and only a subset of these bits need be tested after synchronization has been achieved, the diversity process uses the last 9 bits of the sync pattern to test the RSSI of the new antenna. Thus the figure also includes a diagram of antenna operation.

Figure 6:
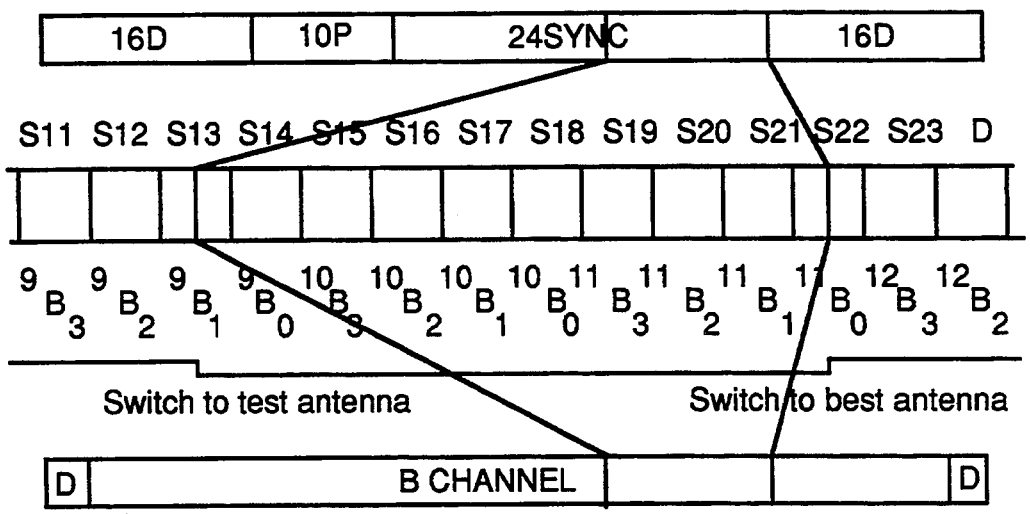
FIG. 6 is a more detailed illustration of parts of the frame formats.

FIG. 6 is a detailed formats of MUX 2 and MUX 3 at the areas of antenna switch. The last half of sync bits are shown as S11–S23 followed by the first of D bit. At S13 bit the antenna is switched to a new test antenna which measures RSSI for 9 successive bits starting at S14. Thus at S22 the result of comparison between RSSI of the test antenna and that of the current antenna determines whether to use the test antenna as the best antenna or to stay on the current antenna for following transmission. If it is so determined, the current antenna is switched back on to receive signal starting at S23. The diversity process therefore during MUX 2, is able to continually sample the RSSI of all antennas with bit hits affecting only an unused part of the synchronization marker. The diversity process allows only an unused antenna to be tested every frame, as this was determined to be a sufficient rate for the fading rates expected for bipedal motion. However, using the same process, all unused antennas could be tested during every 1 ms receive frame, at the expense of more unused synchronization bits or faster hardware sampling circuitry.

Since all antennas are being tested at a rate (every 2 ms with 2 antennas, and 4 ms with 3 antennas) much faster than the fading rate (maximum rates are approximately 20 ms), the process for MUX 2 antenna diversity results in virtually perfect diversity switching.

MUX 1 format is shown also in FIG. 6 and contains no synchronization information, and as such assumes that bits and clock recovery are stable. In MUX 1, a hit to any one of the received bits will result in an error. Therefore, the purpose of the MUX 1 diversity process is to minimize the "perceived" impact of these bit hits.

In the ETSI CAI specifications, the B channel holds 16 adaptive differential pulse code modulation (ADPCM) data samples, each of which is 4 bits in length. These samples, which represent differential changes in linear digitally encoded voice, have a predefined ordering of bit positions, from most significant bit (MSB) to least significant bit (LSB). Since these samples represent changes in voice data, it follows that changes in LSB values will have less impact on the resulting linear digital voice than do changes in MSB values. The MUX 1 diversity process uses this fact. FIG. 6 shows corresponding bit positions between MUX 2 and MUX 1. In the figure the 9th nibble of B channel is made up of $^9B_3\,^9B_2\,^9B_1\,^9B_0$ with $^9B_3$ being MSB and $^9B_0$ being LSB. Likewise, the 10th nibble is made up of $^{10}B_3\,^{10}B_2\,^{10}B_1\,^{10}B_0$, with $^{10}B_3$ being MSB and $^{10}B_0$ LSB. Therefore $^9B_1$ corresponds to S13 and $^{11}B_0$ to S22.

Antenna switches, to test RSSI on unused antennas, are performed during the B channel so that if a bit is corrupted during the antenna switch, that the corrupted bit will be a LSB bit of an ADPCM nibble. To this end, the MUX 1 diversity process is able to switch antenna during the B channel, test the RSSI of an unused antennas, and either remain on the new antenna or switch back to the previous antenna.

The entire process, in the implementation used in the base station requires a maximum sample time on the new antenna of two nibbles (approximately 100 $\mu$s), and if the tested antenna has a lower RSSI than the current antenna, then only two ADPCM samples will be lost. It is important to note that if the RSSI on the sampled antenna is less than a mute threshold (a predefined threshold which specifies the limit of the base station to receive data with a bit error rate, BER, less than 0.1%), then the two nibbles are zeroed which minimizes the changes in the linear digital voice decoded from the ADPCM data.

The "perceived" errors in the data stream can be further minimized. Therefore in another embodiment, the MUX 1 diversity process limits the rate of antenna testing, and thus antenna switching (and B channel bit hits) to once per 5 receive frames (every 10 ms). This limit ensures that the BER of the B channel does not exceed 1%, due to selection of an antenna with a lower RSSI than the current antenna.

In yet another embodiment, various values of RSSIs are monitored and stored. They are used to switch antennas to more precisely follow the changing characteristics of fading and other circumstances. Therefore the following values are stored, "filtered RSSI" (a long term average RSSI), "peak RSSI" (the highest RSSI sample since the last antenna switch), and instantaneous "sampled RSSI". In the MUX 1 in this embodiment, if the "samples RSSI" drops by a margin called "RSSI Delta" below the "filtered RSSI", then a new antenna will be sampled, limited to a maximum rate of once per five frames (e.g. 10 ms), unless the "sampled RSSI" is less than a perfect diversity threshold (a predefined level at which the probability of dropping the link becomes quite high) in which case an antenna is sampled at every frame (e.g. 2 ms). In this manner, priority shifts from minimizing user perceived bit hits, to maintaining the link, by ensuring that the best antenna is always selected. In addition, and not limited by a 10 ms maximum sample rate, if the "sampled RSSI" drops by a margin called "peak RSSI Delta" below the "peak RSSI", then a new antenna will be sampled and "peak RSSI" will be updated. This absolute RSSI trigger catches both the very fast fades as well as the very slow fades.

I claim:

1. A process of performing antenna diversity in reception of a digital radio signal transmitted in time division pulse coded frames, each frame containing a fixed number of coded bits in at least two specific formats, the first format consisting of Data Channel bits and Bearer Channel bits and the second format consisting of Data Channel bits, preamble bits and sync bits comprising steps of:

receiving said digital radio signal by one of a plurality of antennas;

generating a received signal strength indication RSSI of said one antenna;

when said digital radio signal is in the first format, switching said one antenna to one of the remaining antennas to receive a predetermined number of said Bearer Channel bits in one frame, starting at one of said Bearer Channel bits and ending at another of said Bearer Channel bits both of which have low significance in decoding the first format;

when said digital radio signal is in the second format, switching said one antenna to one of the remaining antennas to receive a predetermined number of said sync bits in one frame, starting and ending at said sync bits which correspond in bit position to those of the first format and have low significance in decoding the second format;

deriving a RSSI of said one of the remaining antennas;

comparing the RSSI of said one antenna with the RSSI of said one of the remaining antennas; and choosing the antenna with a larger RSSI for reception of following frames of the digital radio signal at one of said Bearer Channel bits in said first format and at said sync bits in said second format which correspond in bit position to those of the first format.

2. The process of performing antenna diversity in the reception of the digital radio signal according to claim 1, wherein when said digital radio signal is in the first format, the step of switching said one antenna to one of the remaining antennas is conducted at every preselected numbered frame only.

3. The process of performing antenna diversity in the reception of the digital radio signal according to claim 2, comprising further steps of storing more than one value of RSSI and switching said one antenna to one of the remaining antennas at said every preselected numbered frame only depending upon said values.

4. The process of performing antenna diversity in the reception of the digital radio signal according to claim 3, wherein there are no less than three antennas and the step of switching to one of the remaining antennas is carried out in sequence.

5. An antenna diversity reception apparatus for a base station in a wireless personal communications system which uses digital radio signals transmitted in time division pulse coded frames, each frame containing a fixed number of coded bits in at least two specific formats for data transmission and management of the communications system, the first format consisting of Data Channel bits and Bearer Channel bits and the second format of Data Channel bits, preamble bits and sync bits, comprising:

a plurality of antennas;

a digital radio signal receiving part;

an RF switch for switchably connecting one of said plurality of antennas to said receiving part;

an RSSI measuring means for measuring received signal strength indication RSSI of said one of said plurality of antennas which is connected to said receiving part; and an antenna controller for controlling the RF switch so that when said digital radio signal is in the first format, one of said remaining antennas is connected to said receiving part for a predetermined number of said Bearer Channel bits in one frame, starting at one of said Bearer Channel bits and ending at another of said Bearer Channel bits both of which have low significance in decoding the first format, and when said digital radio signal is in the second format, one of said remaining antennas is connected to said receiving part for a predetermined number of said sync bits in one frame, starting and ending at said sync bits which correspond in bit position to those of the first format and have low significance in decoding the second format, and said antenna controller including comparison means further selecting one antenna as the best antenna according to comparison of the measured RSSIs of said one antenna and said one of said remaining antennas for following frames of the digital radio signals.

6. The antenna diversity reception apparatus for a base station in the wireless personal communications system according to claim 5, further comprising storage means for storing more than one value of RSSI, and the antenna controller controlling the RF switch according to the stored values.

* * * * *